UNITED STATES PATENT OFFICE.

HENRY FLAD, OF ST. LOUIS, MISSOURI.

IMPROVED FILTER.

Specification forming part of Letters Patent No. 53,287, dated March 20, 1866.

*To all whom it may concern:*

Be it known that I, HENRY FLAD, of St. Louis, in the county of St. Louis, State of Missouri, have invented a new and Improved Filter for Fluids; and I do hereby declare that the following is a full and exact description of the chemical nature and mode of arrangement of such parts as especially comprise my said filter.

The nature of my invention is in the application of a certain mineral substance as a component and active element of a filter or strainer for water or other fluids, said mineral substance being itself of such inorganic structure that it may be beaten or ground to any required size of grain, and being of such chemical and physical nature that it will not be dissolved or decomposed into its chemical elements by the chemical acids or reagents usually found in waters or fluids such as are usually filtered, and, lastly, being of such great specific gravity that the flowing fluids in the process of filtration or of washing the filter-beds shall have the least possible effect to sweep said mineral substance off, and thereby cause a loss of the same.

To enable others skilled in the arts to make and use an improved filter or strainer comprising the substance whose qualities have been before described, I will proceed to explain its construction and operation.

I construct the reservoir or housing in such form and of such material as may be most convenient and economical in erection and construction and for the peculiar purposes of application of the filter or strainer. On the bottom of such reservoir or housing I place a stratum of larger stones laid as much as practicable so as to break vertical joints in the manner of brick in a common wall. Upon this stratum I place another stratum of stones of a somewhat smaller size laid in a similar manner as the stones of the first stratum. Of such strata I pile up a number with continually-decreasing sizes of stone to a height which will depend upon the sizes of stone used and upon the condition of impurity of the fluid to be filtered. In the filter-beds usually used the topmost stratum is usually fine gravel, the bottom stratum being comparative large lime or sand stones; but the inversion of this arrangement has also been used with success. In a filter-bed so formed the weight of the heavier strata of larger stone on the lowest stratum of fine gravel compresses it in a manner to decrease the size of the interstices between adjacent grains of gravel, and thus retaining somewhat greater quantities of impurities out of the filtered fluid.

As all the arrangements hitherto described are in common and successful use, and do not enter especially into the nature of my improved filter or strainer, I hereby expressly disclaim any intention of claiming such arrangements as hitherto described, or any part or portion thereof, as my invention; but I do hereby expressly declare that the application of the substance now to be especially described upon a filter imperfectly prepared, as described in the said arrangements in common use, whether said application of said substance be in great or in small quantity, in large or in small size or bulk of grain, is my invention, and that the same be secured to me I do herewith pray.

If the filter or strainer is arranged in the manner first-above described, with the stratum of smallest grain uppermost, I place upon such uppermost stratum (and if the filter or strainer is arranged in the manner second-above described, with the stratum of smallest grain undermost, then I place under said lowest stratum,) of the common filter a stratum of a certain mineral substance commonly called "tiff" or "heavy spar," ground to such fineness of grain as may be by experiment found most suited to secure economy of time, labor, and expense in filtering processes, said tiff or heavy spar being sulphate of baryta, and being an article of commerce, and therefore accessible to the uses hereinbefore mentioned. I do hereby especially claim that tiff, when used as a powder of the requisite fineness of grain, will make more effective as a filter or strainer the arrangements commonly in use for filtering, if used in combination with said arrangements. Moreover, said mineral substance called "tiff" may be used advantageously without any of the arrangements now in use in the manner following: by placing stratum upon stratum of said tiff, varying the size of grain thereof, and placing the tiff stones of each stratum so that they break joints.

To show the great advantage arising from the use of tiff in the manner aforesaid, I will mention it can be ground to powder of any required size of grain, it being already used in commerce as a fine powder for the adulteration of white lead for purposes of painting, &c. It has a very great specific gravity, the same being 5°, which is greater than the specific gravity of any mineral substance which could be extensively supplied and used for filtering purposes; that, owing to this great weight of the tiff stones or the grains of tiff, (when it is used as a powder,) the fluids to be filtered will be less capable of mixing the parts of one stratum of the filter or strainer with those of another, and of carrying the grains of the finest-grained stratum along with the filtering fluids themselves. Moreover, as it is usual to cleanse such filter-beds by reversing the passage of fluid, and washing thus the strata themselves, using in this process an increased pressure and velocity of cleansing-fluids, during this process of cleansing the particles of tiff, owing to their great specific gravity, will remain inert, and will not therefore be swept off and lost to usefulness in the sweepings and washings. It is, lastly, owing to its chemical constitution as a union between the strong acid, sulphuric acid, and the base baryta practically insoluble in common water and many other fluids, and, owing to the strong chemical affinity existing between its chemical components, it resists greatly the decomposing action of such acids as carbonic acid, sulphureted hydrogen, &c., as are or may be contained in fluids.

Having thus described my said invention, what I claim, and desire to secure by Letters Patent, is—

1. In combination with filters or strainers composed of layers or strata of common stone or any other substances now commonly used, a stratum of pulverized tiff or sulphate of baryta of the proper fineness of grain, as hereinbefore set forth.

2. A filter or strainer composed of strata of tiff or sulphate of baryta of varying fineness of grain.

HENRY FLAD.

Witnesses:
WM. RANDOLPH,
A. WAGNER.